United States Patent
Jain et al.

(10) Patent No.: US 8,982,691 B2
(45) Date of Patent: Mar. 17, 2015

(54) SYSTEM AND METHOD PROVIDING STANDBY BYPASS FOR DOUBLE FAILURE PROTECTION IN MPLS NETWORK

(71) Applicants: Pradeep Jain, Sunnyvale, CA (US); Kanwar Singh, Mountain View, CA (US); Srikrishnan Venkataraman, Santa Clara, CA (US)

(72) Inventors: Pradeep Jain, Sunnyvale, CA (US); Kanwar Singh, Mountain View, CA (US); Srikrishnan Venkataraman, Santa Clara, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 202 days.

(21) Appl. No.: 13/630,908

(22) Filed: Sep. 28, 2012

(65) Prior Publication Data
US 2014/0092722 A1    Apr. 3, 2014

(51) Int. Cl.
*G01R 31/08* (2006.01)
*H04L 12/26* (2006.01)

(52) U.S. Cl.
CPC ............................ *H04L 12/26* (2013.01)

USPC .......................................... 370/221; 370/225

(58) Field of Classification Search
USPC ................... 370/216–221, 225, 228, 231, 237
See application file for complete search history.

(56) References Cited

U.S. PATENT DOCUMENTS

| 6,778,492 B2 * | 8/2004 | Charny et al. ................. 370/228 |
| 8,296,407 B2 * | 10/2012 | Doshi et al. ..................... 709/223 |
| 2006/0114818 A1 * | 6/2006 | Canali et al. ..................... 370/216 |
| 2006/0159009 A1 * | 7/2006 | Kim et al. ......................... 370/216 |

\* cited by examiner

*Primary Examiner* — Curtis A Alia
(74) *Attorney, Agent, or Firm* — Kramer & Amado, P.C.

(57) ABSTRACT

A method for providing a Backup Label Switched Path for a specified Bypass Label Switch Path is disclosed. The method for providing a Backup Label Switched Path for a specified Bypass Label Switch Path includes establishing a Bypass LSP having an end-to-end path; obtaining the nodes traversed by the end-to-end path; generating a request to a path calculator which using the nodes provided on the end-to-end path calculates a path disjoint to those nodes; and signaling the calculated disjoint path as a Backup LSP for the Bypass LSP. The method for providing a Backup Label Switched Path for a specified Bypass Label Switch Path provides protection advantages over systems known in the art by providing capability for handling double failure scenarios.

10 Claims, 5 Drawing Sheets

SYSTEM AND METHOD PROVIDING STANDBY BYPASS FOR DOUBLE FAILURE PROTECTION IN MPLS NETWORK

FIELD OF THE INVENTION

The invention relates to an MPLS protection method, and more particularly to a method for providing a standby Label Switched Path which operates to protect a Backup Label Switched Path.

BACKGROUND OF THE INVENTION

Service Providers that use RSVP-TE Label Switched Paths (LSPs) typically uses some form of protection mechanism for protecting the LSPs from any un-expected failures. The most common way of LSP protection is Fast Re-Route (FRR). But the above protection approaches protects the LSP with only single failure, i.e. if the RSVP Tunnel discovers a failure it will commence using the FRR (Backup) Path to make sure it stays up and service is not disrupted. MPLS Fast Reroute (also called MPLS local restoration or MPLS local protection) is a local restoration network resiliency mechanism. It is a feature of RSVP Traffic Engineering (RSVP-TE).

Figure 1A:
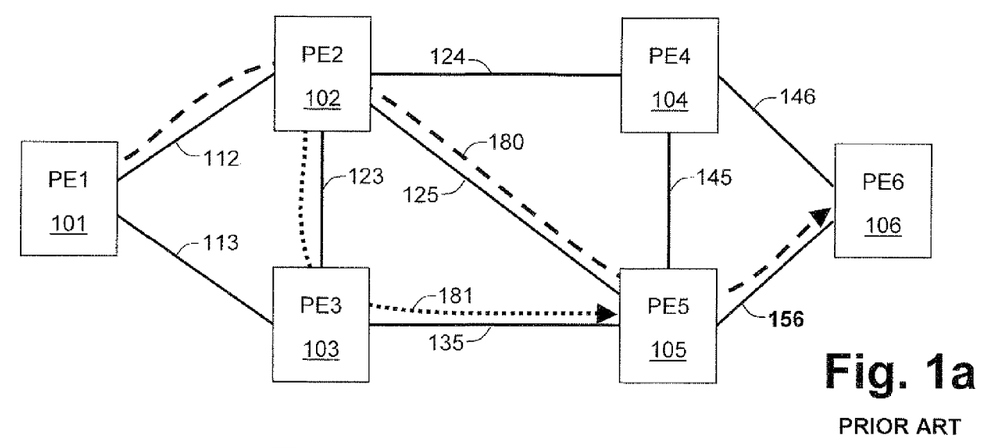
FIG. 1a illustrates an exemplary MPLS network MPLS Label Switched Routers interconnected by facilities and supporting a primary Label Switched Path and a Bypass Label Switched Path according to the prior art.

Referring to FIG. 1a there may be seen an exemplary network having six MPLS Label Switch Routers PE1 101, PE2 102, PE3 103, PE4 104, PE5 105, and PE6 106. Each of the Label Switch Routers has a facility linking them to other Label Switch Routers in the exemplary network. Thus facility 112 links Label Switch Routers 101 and 102; facility 113 links Label Switch Routers 101 and 103; facility 123 links Label Switch Routers 102 and 103; facility 124 links Label Switch Routers 102 and 104; facility 125 links Label Switch Routers 102 and 105; facility 135 links Label Switch Routers 103 and 105; facility 145 links Label Switch Routers 104 and 105; facility 146 links Label Switch Routers 104 and 106; and facility 156 links Label Switch Routers 105 and 106.

In FIG. 1a Label Switched Path 180 may be seen connecting PE1 101 to PE6 106 while traversing network nodes PE2 102 and PE5 105. In MPLS local protection each LSP passing through a facility is protected by a Backup path which originates at the node immediately upstream to that facility. This node which redirects the traffic onto the preset Backup path is called the Point of Local Repair (PLR), and the node where a Backup LSP merges with the primary LSP is called Merge Point (MP). In FIG. 1a facility 125 has PE2 102 as its Point of Local Repair, and PE5 105 as its Merge Point. Bypass LSP 181 provides a Bypass LSP around facility 125.

This mechanism (local protection) provides faster recovery because the decision of recovery is strictly local. By way of comparison, when recovery mechanisms are employed at the IP layer, restoration may take several seconds which is unacceptable for real-time applications (such as VoIP). In contrast, MPLS local protection meets the requirements of real-time applications with recovery times comparable to those of SONET rings (<50 ms).

Figure 1B:
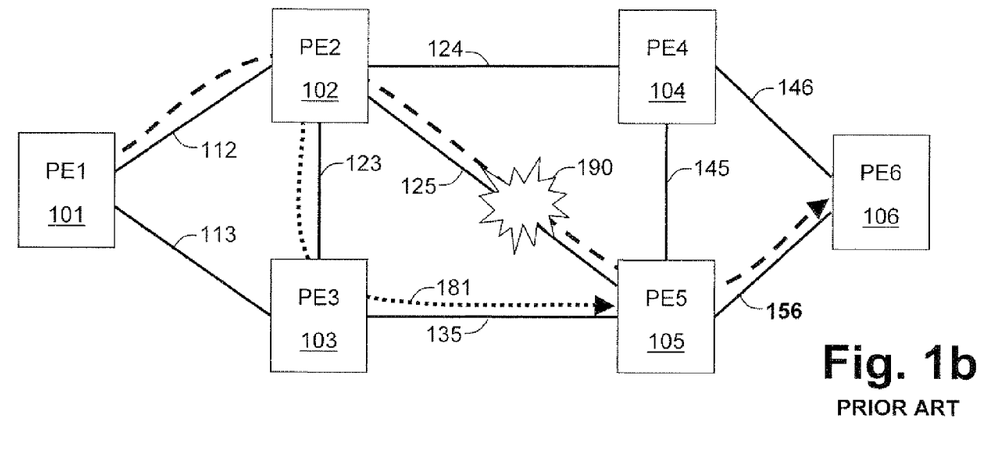
FIG. 1b illustrates the exemplary MPLS network of FIG. 1a with the presence of a fault on one of the facilities such that the Bypass LPS provides protection.

Referring to FIG. 1b, the use of Backup LSP 181 is illustrated. In FIG. 1b, the exemplary network of FIG. 1a has suffered a fault 190 to facility 125, thus interrupting LSP 180. The local protection mechanism operates to provide Bypass LSP 181 around the fault at facility 125, thus allowing continuity of service.

However, this method of protection operates to protect against single faults. In the event of a scenario where an LSP is already been protected by a Bypass LSP (FRR), and there is a second failure in the network which causes the FRR/Bypass LSP also to go down, the whole LSP would go down. The service originally supported by the LSP is disrupted. For example, in reference to FIG. 1b, were there the presence of the first fault 190, and then the occurrence of a second fault on facility 135, then both primary and Bypass LSPs would be broken. The MPLS Fast Reroute standard does not address the double failure scenario.

SUMMARY OF THE INVENTION it is an object of the invention to provide a method of providing protection to Bypass LSPs in MPLS Fast Reroute systems so as to accommodate double-fault scenarios insofar as the network topology allows for such protection.

According to a first aspect of the invention there a provided a method performed by a network processor for providing a Backup Label Switched Path (LSP) to an already established Bypass LSP, the method having the steps of: establishing a Bypass LSP having a Point of Local Repair node and a Merge Point node; obtaining the nodes traversed by the end-to-end path of the Bypass LSP from the Point of Local Repair Node to the Merge Point node; generating a request to a path calculator using the nodes traversed by the end-to-end path of the Bypass LSP for a disjoint path connecting the Point of Local Repair Node to the Merge Point node; receiving a response from the path calculator and in the event that a fully disjoint path connecting the Point of Local Repair Node to the Merge Point node is available, then signaling the disjoint path as a Backup LSP to the Bypass LSP.

In some embodiments of this aspect of the invention the path calculator is a constraint based shortest path first calculator.

In some embodiments of this aspect of the invention there is a further step after the receiving step, wherein in the event that a fully disjoint path connecting the Point of Local Repair Node to the Merge Point node is not available, then in the event that a partially disjoint path connecting the Point of Local Repair Node to the Merge Point node is available, then signaling the disjoint path as a Backup LSP to the Bypass LSP. In some of these embodiments of this aspect of the invention there is a further step, wherein in the event that a partially disjoint path connecting the Point of Local Repair Node to the Merge Point node is not available, then signaling an error on the attempt to provide a Backup LSP.

In other embodiments of this aspect of the invention there are the further steps of procuring the Shared Risk Link Groups (SRLG) associated with the nodes traversed by the end-to-end path of the Bypass LSP from the Point of Local Repair Node to the Merge Point node; and providing the Shared Risk Link Groups as part of the generating a request step to the calculator for use in calculating the disjoint path.

According to another aspect of the invention there a provided a non-transitory machine readable storage medium encoded with instructions for execution by a network processor providing a Backup Label Switched Path (LSP) to an already established Bypass LSP, the medium having: instructions for establishing a Bypass LSP having a Point of Local Repair node and a Merge Point node; instructions for obtaining the nodes traversed by the end-to-end path of the Bypass LSP from the Point of Local Repair Node to the Merge Point node; instructions for generating a request to a path calculator using the nodes traversed by the end-to-end path of the Bypass LSP for a disjoint path connecting the Point of Local Repair Node to the Merge Point node; instructions for receiving a response from the path calculator and in the event that a fully disjoint path connecting the Point of Local Repair Node to the Merge Point node is available, then signaling the disjoint path as a Backup LSP to the Bypass LSP.

In some embodiments of this aspect of the invention the path calculator is a constraint based shortest path first calculator.

In some embodiments of this aspect of the invention the instructions specify a further step after the receiving step, wherein in the event that a fully disjoint path connecting the Point of Local Repair Node to the Merge Point node is not available, then in the event that a partially disjoint path connecting the Point of Local Repair Node to the Merge Point node is available, then signaling the disjoint path as a Backup LSP to the Bypass LSP. In some of these embodiments the instructions further provide a step after the receiving step, wherein in the event that a partially disjoint path connecting the Point of Local Repair Node to the Merge Point node is not available, then signaling an error on the attempt to provide a Backup LSP.

In other embodiments of this aspect of the invention the instructions specify after the obtaining step the further steps of: procuring the Shared Risk Link Groups (SRLG) associated with the nodes traversed by the end-to-end path of the Bypass LSP from the Point of Local Repair Node to the Merge Point node; and providing the Shared Risk Link Groups as part of the generating a request step to the calculator for use in calculating the disjoint path.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In the following figures, like reference numbers are used to represent like elements.

Figure 2:
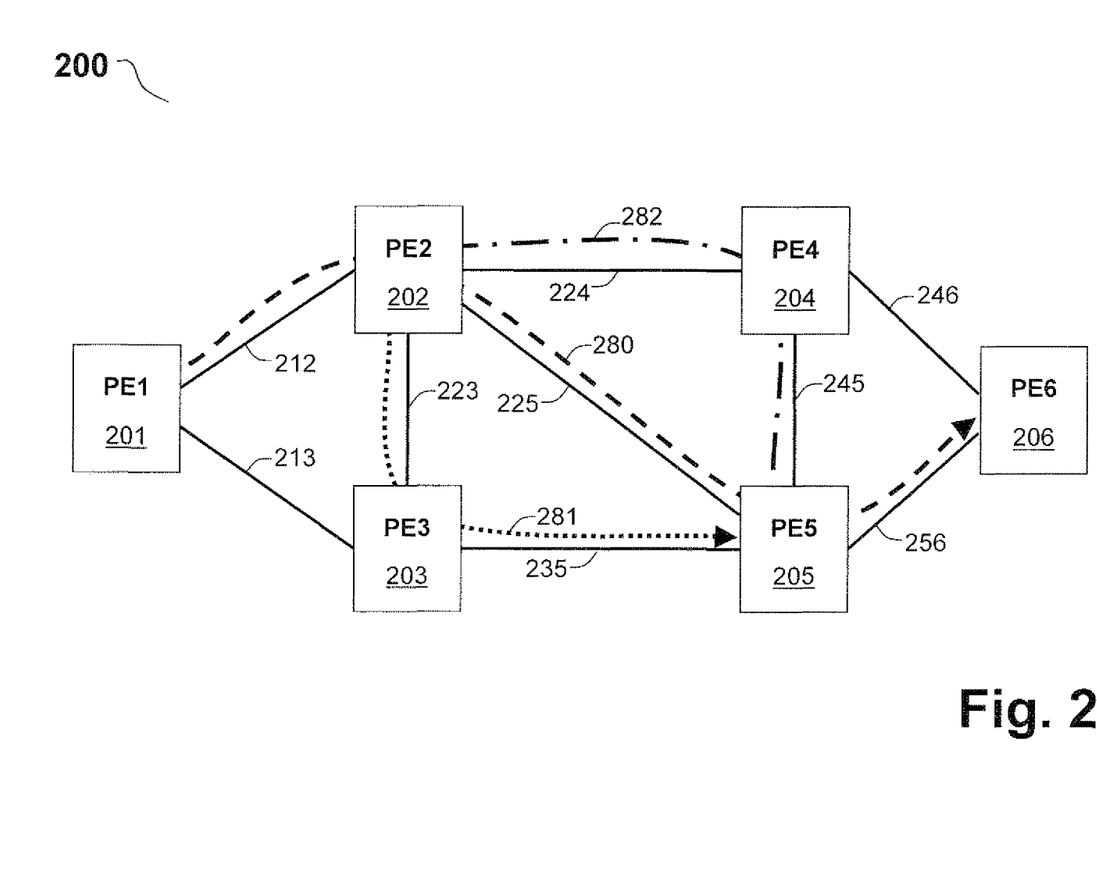
FIG. 2 illustrates an exemplary MPLS network MPLS Label Switched Routers interconnected by facilities and supporting a primary LSP, a Bypass LSP, and a Backup LSP according to an embodiment of the invention.

Referring now to FIG. 2, there may be seen an exemplary MPLS network according to an embodiment of the invention. Referring to FIG. 2 there may be seen an exemplary network having six MPLS Label Switch Routers PE1 201, PE2 202, PE3 203, PE 4 204, PE5 205, and PE6 206. Each of the Label Switch Routers has a facility linking them to other Label Switch Routers in the exemplary network. Thus facility 212 links Label Switch Routers 201 and 202; facility 213 links Label Switch Routers 201 and 203; facility 223 links Label Switch Routers 202 and 203; facility 224 links Label Switch Routers 202 and 204; facility 225 links Label Switch Routers 202 and 205; facility 235 links Label Switch Routers 203 and 205; facility 245 links Label Switch Routers 204 and 205; facility 246 links Label Switch Routers 204 and 206; and facility 256 links Label Switch Routers 205 and 206.

In FIG. 2 Label Switched Path 280 may be seen connecting PE1 201 to PE6 206 while traversing network nodes PE2 202 and PE5 205. In FIG. 2 facility 225 has PE2 202 as its Point of Local Repair, and PE5 205 as its Merge Point. Bypass LSP 281 provides a Bypass LSP around facility 225. Also in FIG. 2 may be seen Backup LSP 282 which provides protection for Bypass LSP 281. Backup LSP 282 uses the same Point of Local Repair, and the same Merge Point as Bypass LSP 281, but uses disjoint facilities to Bypass LSP 281.

Figure 3:
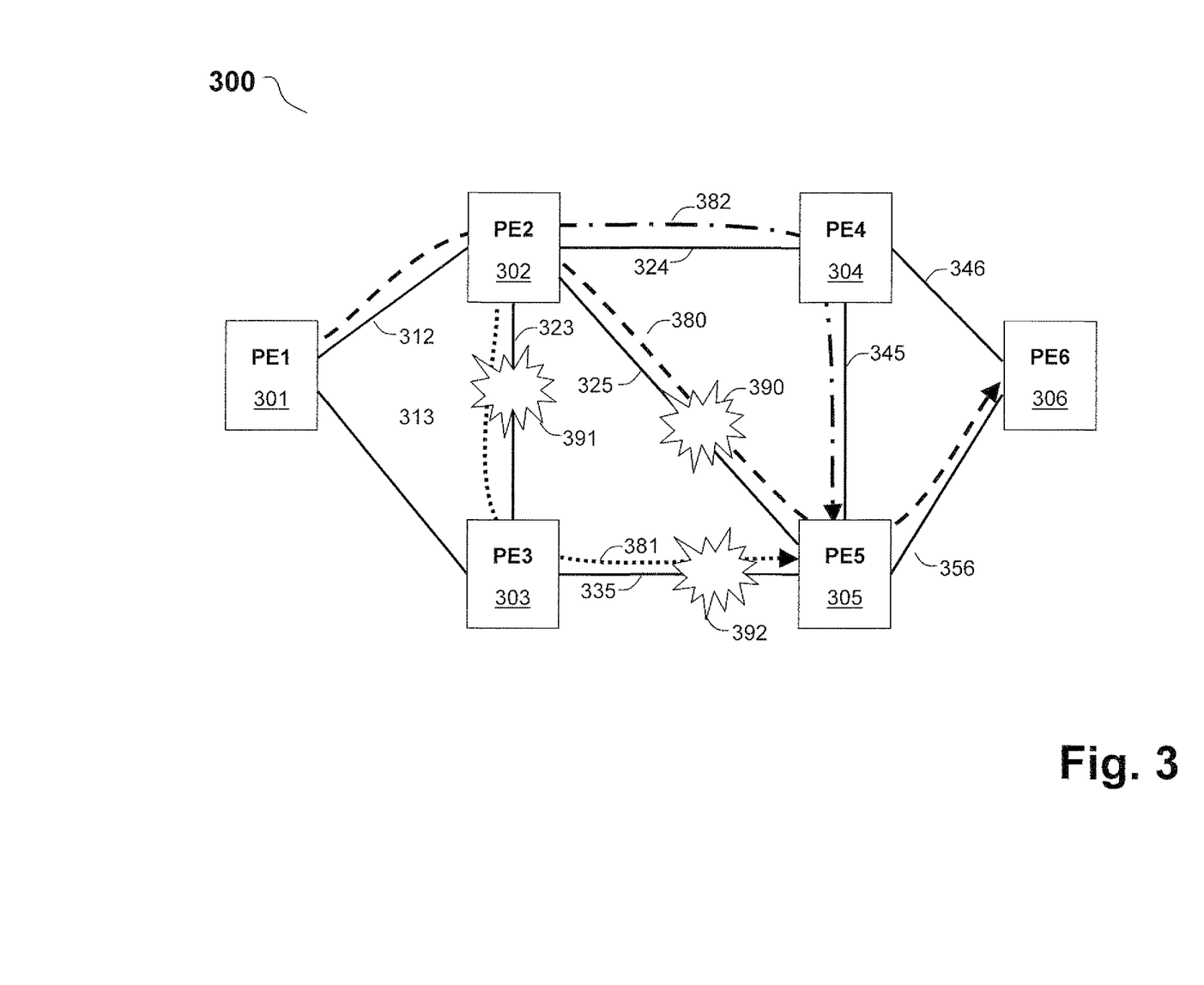
FIG. 3 illustrates the exemplary MPLS network of FIG. 2 with the presence of a fault on one of the facilities used by the primary LSP and a fault on a facility of the Bypass LPS, such that the Backup LSP provides protection according to an embodiment of the invention.

In FIG. 3 the MPLS Network of FIG. 2 is shown with the presence of faults. A first fault 390 has disrupted facility 325, thus breaking Primary LSP 380. Bypass LSP 381 would normally compensate for the failure of facility 325 by providing an LSP connection from PE2 302 as a Point of Local Repair, to PE5 305 as its Merge Point. However, the presence of a second fault, namely fault 391 on facility 323 or fault 392 on facility 335 will break Bypass LSP 381. Backup LSP 382 connects to the same Point of Local Repair, namely PE2 302, and to the same Merge Point, namely PE5 305 as Bypass LSP 381. Thus, in the event of a fault on Bypass LSP 381, it may replace Bypass LSP 381 and provide protection for this LSP.

Typically in order to protect against dual failures in the network, the network operator would need to configure a standby path on each individual LSP. The issue with this approach is the computational complexity involved in such a calculation. Typically this computation will be of order(n) complexity, since it will be necessary to configure and maintain the n-standby paths of the LSP. As typically in the networks there are n LSP's which are protected by the same Bypass LSP, embodiments of the present invention extend the idea of the standby path for bypass tunnel, so that it can provide protection against dual failures without the need to maintain the n-standby path of the LSP.

Figure 4:
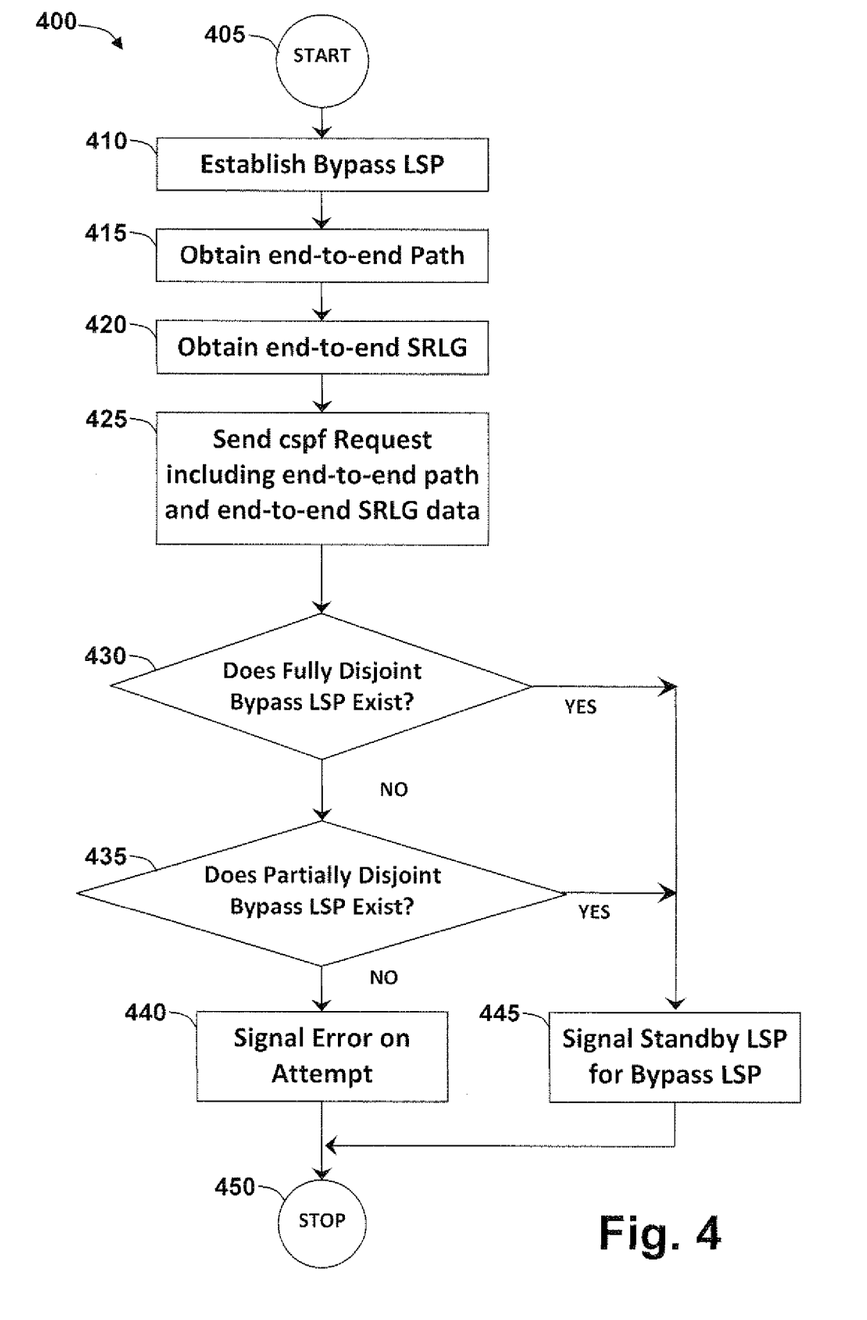
FIG. 4 illustrates a flowchart of a method of providing a Backup LSP for a Bypass LSP according to an embodiment of the invention.

Referring to FIG. 4 there may be seen a flowchart of a method 400 of providing a Backup LSP for a Bypass LSP according to an embodiment of the invention. The method is normally carried out on a network equipment processor located at an MPLS node in the network. The method may commence at step 405. At step 410 the main Bypass LSP is established. The end-to-end path of the main Bypass LSP based upon the nodes it is traversing may be obtained from the Explicit_Route_Object of the path message provided by RSVP Traffic Engineering and is obtained at step 415. Additionally, at step 420, the Shared Risk Link Groups (SLRG) associated with the primary LSP may be obtained if it is configured in the network and exchanged using Interior Gateway Protocol (IGP). At step 425 the collected information is submitted to a calculation which will provide a Backup LSP disjoint to the Bypass LSP, and which respects the associated SLRG if provided. This calculation may be a calculation such as a constraint based shortest path first calculation as is known in the art.

At step 430 a test is performed to determine if the network can support a fully disjoint Backup LSP for the Bypass LSP. In the event that it can, control passes to step 445 wherein the Standby LSP for the Backup LSP is signaled to the MPLS Label Switches, and then control passes to step 450 and concludes.

In the event that the test at step 430 determines that the network cannot support a fully disjoint Backup LSP for the Bypass LSP, control passes to step 435 at which a test is performed to determine if the network can support a partially disjoint Backup LSP for the Bypass LSP. If a partially disjoint Backup LSP can be established, then control passes to step 445 wherein the Standby LSP for the Backup LSP is signaled to the MPLS Label Switches, and then control passes to step 450 and concludes. Note that the establishment of the Standby LSP in the partially disjoint case is optional, as it may protect against partial failures, and the network operator may prefer partial protection to an absence of protection for the Bypass LSP. It is also possible in some versions of embodiments of the invention that there would be additional steps performed in the background to re-attempt to establish a fully disjoint Standby LSP. This re-attempt could take place after a certain time interval had passed.

In the event that the test at step 435 determines that the network cannot support even a partially disjoint Backup LSP for the Bypass LSP, control passes to step 440 where an error is signaled on the attempt to generate a Backup LSP. Control then passes to step 450 and concludes.

Figure 5:
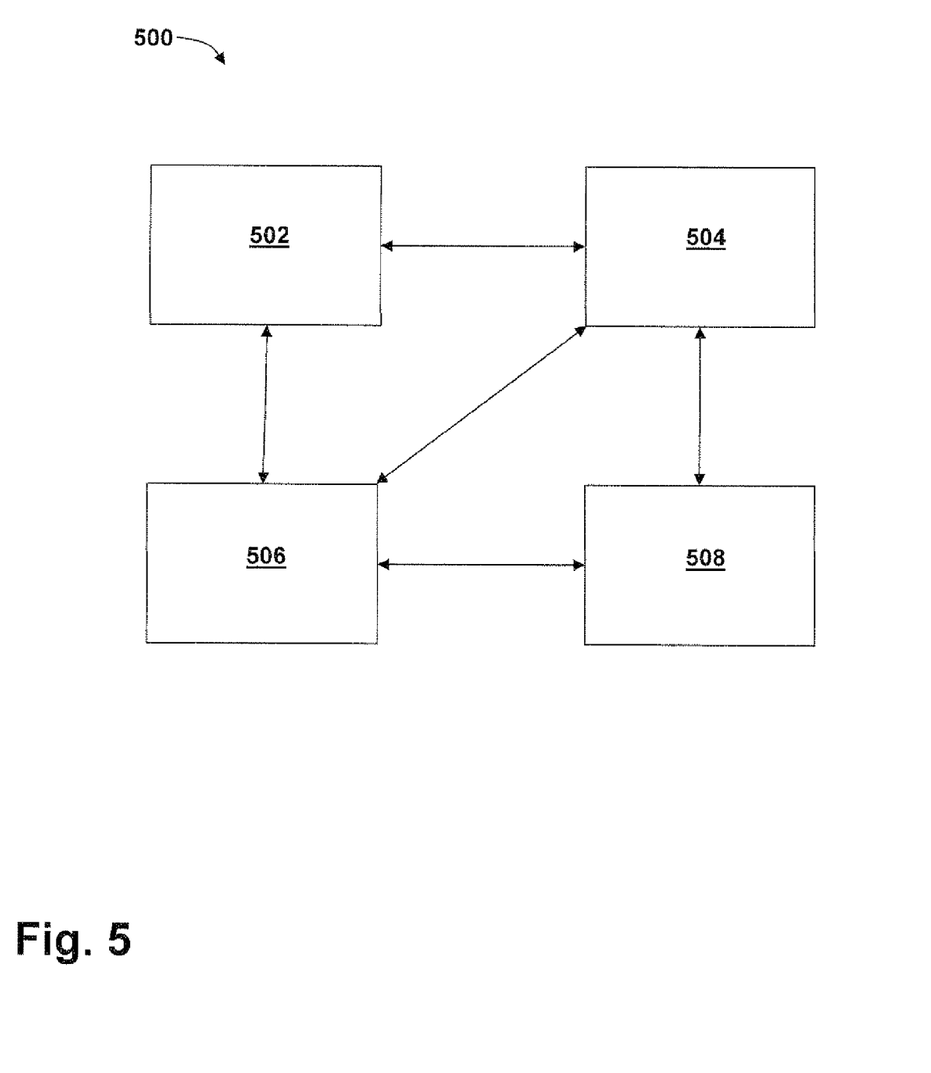
FIG. 5 illustrates a block diagram of a network equipment processor assembly according to an embodiment of the invention.

Referring now to FIG. 5, a network equipment processor assembly 500 which in certain embodiments may be used in the calculation of the Backup LSP, includes a network equipment processor element 506 (e.g., a central processing unit (CPU) and/or other suitable processor(s)), a memory 508 (e.g., random access memory (RAM), read only memory (ROM), and the like), a cooperating module/process 502, and various input/output devices 504 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 502 can be loaded into memory 508 and executed by network equipment processor 506 to implement the functions as discussed herein. As well, cooperating process 502 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

Therefore what has been disclosed is a method for providing a Backup LSP for the Bypass LSP of an MPLS network so as to provide protection in a double failure scenario. The method generates a Backup LSP for the Bypass LSP which originates at the Point of Local Repair and terminates at the Merge Point and is disjoint from the Bypass LSP.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method performed by a network processor of a Multiprotocol Label Switching (MPLS) label switch router for providing a Backup Label Switched Path (LSP) to a Bypass LSP already established for a Protected Primary LSP, the method comprising the steps of:
    protecting the Primary LSP against dual failures, comprising:
        establishing the Bypass LSP for the Protected Primary LSP having a Point of Local Repair node and a Merge Point node;
        obtaining the nodes traversed by an end-to-end path of said Bypass LSP from said Point of Local Repair Node to said Merge Point node;
        generating a request to a path calculator using the nodes traversed by said end-to-end path of said Bypass LSP for a disjoint path connecting said Point of Local Repair Node to said Merge Point node;
        receiving a response from said path calculator; and
        in response to determining that a fully disjoint path connecting said Point of Local Repair Node to said Merge Point node is available, signaling, to at least one other MPLS label switch router, said fully disjoint path as the Backup LSP to said Bypass LSP.

2. A method as claimed in claim 1, wherein said path calculator is a constraint based shortest path first calculator.

3. A method as claimed in claim 1, wherein in response to determining that the fully disjoint path connecting said Point of Local Repair Node to said Merge Point node is not available,
    in response to determining that a partially disjoint path connecting said Point of Local Repair Node to said Merge Point node is available, signaling, to at least one other MPLS label switch router, said partially disjoint path as the Backup LSP to said Bypass LSP.

4. A method as claimed in claim 3, wherein in response to determining that a partially disjoint path connecting said Point of Local Repair Node to said Merge Point node is not available, then
    signaling an error on the attempt to provide a Backup LSP.

5. A method as claimed in claim 1 after said obtaining step, comprising further steps of:
    procuring a Shared Risk Link Groups (SRLG) associated with the nodes traversed by the end-to-end path of said Bypass LSP from said Point of Local Repair Node to said Merge Point node; and
    providing said Shared Risk Link Groups as part of said generating a request step to said calculator for use in calculating said disjoint path.

6. A non-transitory machine readable storage medium encoded with instructions for execution by a network processor of a Multiprotocol Label Switching (MPLS) label switch for providing a Backup Label Switched Path (LSP) to a Bypass LSP already established for a Protected Primary LSP, the medium comprising:
    instructions for protecting the Primary LSP against dual failures, comprising:
        instructions for establishing the Bypass LSP for the Protected Primary LSP having a Point of Local Repair node and a Merge Point node;
        instructions for obtaining the nodes traversed by an end-to-end path of said Bypass LSP from said Point of Local Repair Node to said Merge Point node;
        instructions for generating a request to a path calculator using the nodes traversed by said end-to-end path of said Bypass LSP for a disjoint path connecting said Point of Local Repair Node to said Merge Point node;
        instructions for receiving a response from said path calculator; and
        in response to determining that a fully disjoint path connecting said Point of Local Repair Node to said Merge Point node is available, instructions for signaling, to at least one other MPLS label switch router, said fully disjoint path as the Backup LSP to said Bypass LSP.

7. A non-transitory machine readable storage medium as claimed in claim 6, wherein the instructions specify that said path calculator is a constraint based shortest path first calculator.

8. A non-transitory machine readable storage medium as claimed in claim 6, wherein in response to determining that the fully disjoint path connecting said Point of Local Repair Node to said Merge Point node is not available,
    in response to determining that a partially disjoint path connecting said Point of Local Repair Node to said Merge Point node is available, signaling, to at least one other MPLS label switch router, said partially disjoint path as the Backup LSP to said Bypass LSP.

9. A non-transitory machine readable storage medium as claimed in claim 6, wherein in response to determining that a partially disjoint path connecting said Point of Local Repair Node to said Merge Point node is not available, signaling an error on the attempt to provide a Backup LSP.

10. A non-transitory machine readable storage medium as claimed in claim 6, wherein the instructions specify after said obtaining step further steps of:
   procuring a Shared Risk Link Groups (SRLG) associated with the nodes traversed by the end-to-end path of said Bypass LSP from said Point of Local Repair Node to said Merge Point node; and
   providing said Shared Risk Link Groups as part of said generating a request step to said calculator for use in calculating said disjoint path.

* * * * *